POTATO PLANTER

Original Filed March 28, 1968 2 Sheets-Sheet 1

POTATO PLANTER

Original Filed March 28, 1968 2 Sheets-Sheet 2

United States Patent Office

Re. 28,207
Reissued Oct. 22, 1974

28,207
POTATO PLANTER

Jack H. Wigham, 4206 NE. 15th St.,
Amarillo, Tex. 79107

Original No. 3,570,424, dated Mar. 16, 1971, Ser. No. 37,495, May 21, 1970, which is a continuation of abandoned application Ser. No. 716,740, Mar. 28, 1968. Application for reissue Mar. 14, 1973, Ser. No. 341,271
Int. Cl. A01c *7/18*
U.S. Cl. 111—78 10 Claims

Matter enclosed in heavy brackets [ ] appears in the original patent but forms no part of this reissue specification; matter printed in italics indicates the additions made by reissue.

ABSTRACT OF THE DISCLOSURE

A tractor mounted three point hitch potato planter that drops the seed close to the bottom of the furrow to prevent its rolling, and which planter is closely hitched with hydraulic lift and can thereby be raised off the ground for tight turns and backing.

*CROSS REFERENCES TO RELATED APPLICATIONS*

This *application is a re-issue of my U.S. Pat. No. 3,570,-424, issued Mar. 16, 1971, which matured from its application Ser. No. 37,495 filed May 21, 1970, which* application is a continuation of application Ser. No. 716,-740 [filled] *filed* on Mar. 28, 1968, now abandoned.

*BACKGROUND OF THE INVENTION*

*1. The field of the invention*

This invention relates to tractor mounted potato planters of the type feeding the seed by conveyor chain from a hopper to a furrow dug by the blade of the planter and having a pair of following discs to cover the seed in the furrow *and pertains to planting apparatuses with an operating frame and a drilling machine wherein material is dispensed by an element moving in such a manner as to intermittently dispense from hopper and including an earth working device adapted to trail behind a propelling means; the hopper is supported on a mobile body and the dispensing element is a moving belt.*

*2. Description of the prior art*

Previously designed planters of this type have the disadvantage that the seed potatoes drop from considerable height into the furrow, and thus have a tendency to bounce and roll resulting in uneven spacing of the plants in the row. Another disadvantage of existing planters is that they trail by means of a pivoted tongue behind the tractor, and while the blades can be lifted at the end of the furrow, the wheels of the planter remain on the ground, adding considerably to the radius of the turns at the end of the field and resulting in considerable time loss if the planter is to be maneuvered by backing to a fence line.

*SUMMARY OF THE INVENTION*

The present invention provides for a potato planter that is attached to the tractor at three points and very close in, so that it can be backed without jackknifing. The three point atachment also allows the planter to be raised completely off the ground for maneuvering or transportation.

The invention further provides for picking up the seed through the center of the hopper, thus keeping the seed agitated so that every cup on the conveyor is sure to pick up a potato, thus eliminating any chance of skipping in the planted furrow.

Another object of the invention is to provide a planter of the type described that can be present to plant at a given depth after being lifted for maneuvering or transportation.

These and other objects will become apparent from the following description and the accompanying drawing [, in which:].

*DESCRIPTION OF THE PREFERRED EMBODIMENT*

The planter used herein for purposes of description is a two row type, but it can also be used as a one row, four row, six row, etc., planter (not shown) for which provision is made in the standard equipment as hereinafter described.

Figure 1:
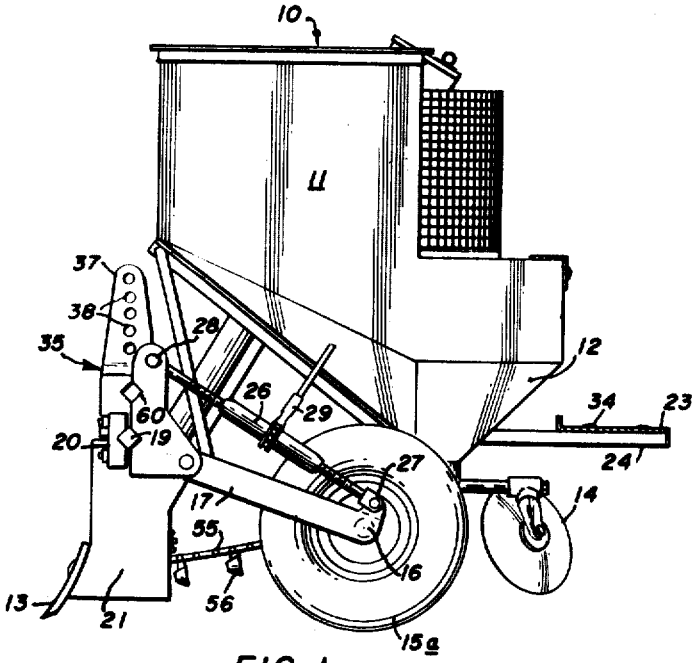
FIG. 1 is a side elevational view of the planter.
Figure 4:
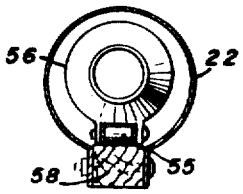
FIG. 4 is an enlarged cross-sectional detail taken along line 4—4 on FIG. 2.
Figure 3:
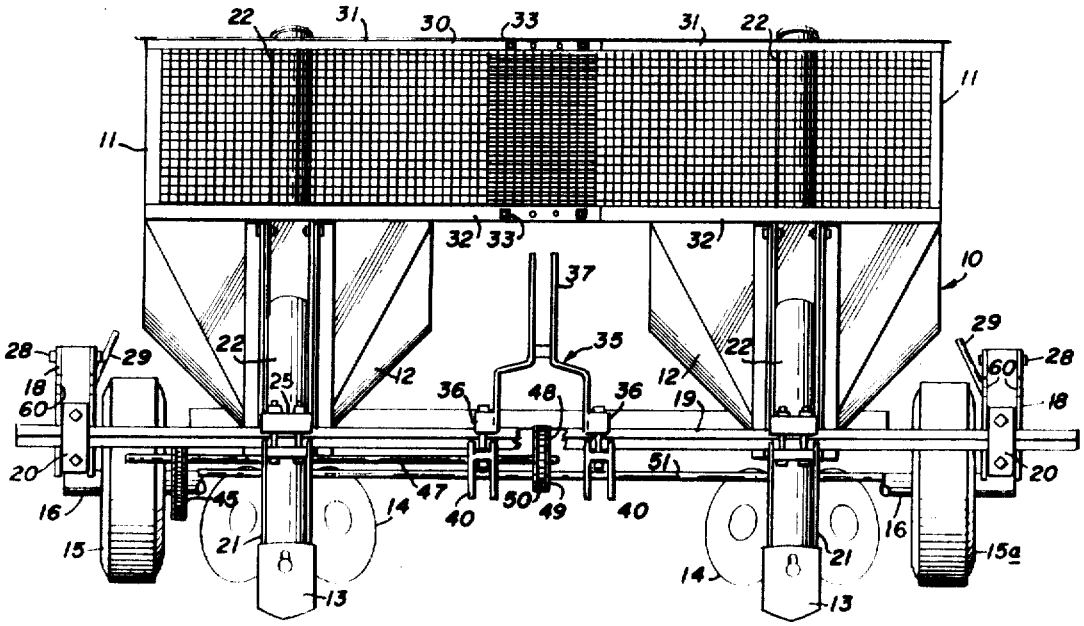
FIG. 3 is a front elevational view of a gang of two planters cut away to show a drive sprocket.

As illustrated in FIGS. 1 and 3, the planter 10 includes a bin 11 for carrying the bulk of the seed which empties by gravity to a hopper 12. A blade 13 on the front of the planter 10 cuts a furrow to a predetermined depth and a pair of adjustable discs 14 return the soil to the furrow after the potatoes are planted.

Bull wheels 15 and 15a on individual axles 16 ride at the ends of rearwardly extending cantilevers 17 which are pivotally attached to a structurally rigid hinge blocks 18 on a heavy square or rectangular crossbar 19, extending the full width of the planter by means of clamps 20. The blade 13 is adjustably attached to a plow unit 21 which forms the lower end of a conveyor tube 22 extending upwardly at an angle through the bin 11.

A running board 23 on brackets 24 extends for the width of the planter on the rear and serves as a structural member as well as a platform from which a rider can observe the operation of the machine or reach into the hoppers if necessary. The plow units 21 are attached to the crossbar 19 by means of clamps *20* [25]. A turnbuckle 26 extends from a pivot 27 close to the axle 16 to a pivot 28 in the upper end of the hinge block 18 and can be adjusted in length by means of a reversible ratchet wrench 29 which is a permanent part of the turnbuckle 26. Lengthening the turnbuckle 26 lowers the bull wheel 15, or conversely, raises the plow unit 21 or vice versa, thus making the depth of the furrow completely adjustable.

The front of the bin 11 consists of a screen 30 on frames 31 or 32. In a two row planter, as illustrated, the distance between the separate planter units can be adjusted by loosening the clamps 20 and 25 and sliding the units along the crossbar 19, and by changing the bolts 33 in the screen frames 31 and 32 and the bolts 34 in the running board 23 for which multiple holes (not shown) are provided.

Figure 2:
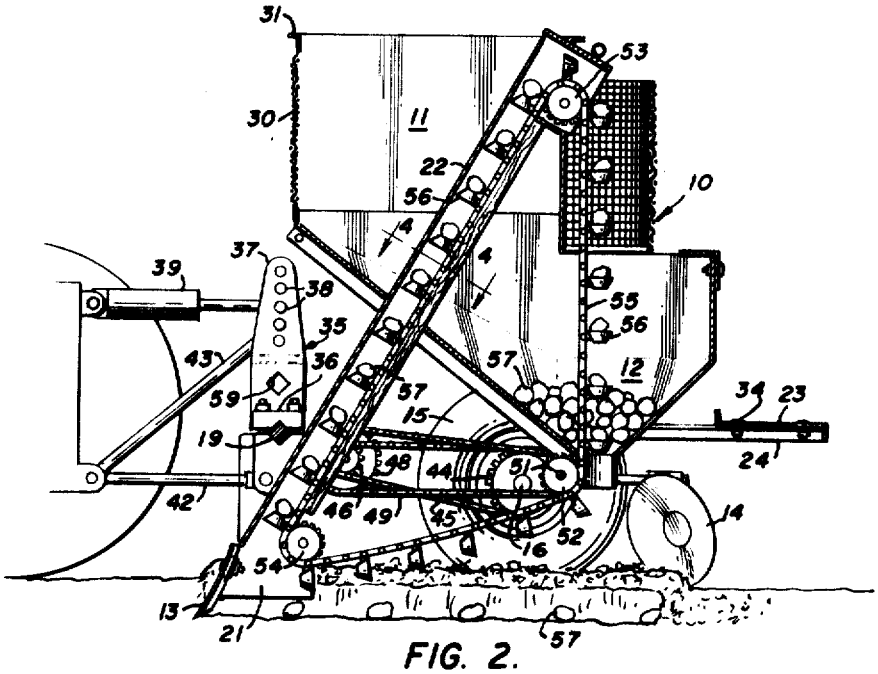
FIG. 2 is a centerline vertical section of the planter showing a typical attachment to a tractor.
Figure 5:
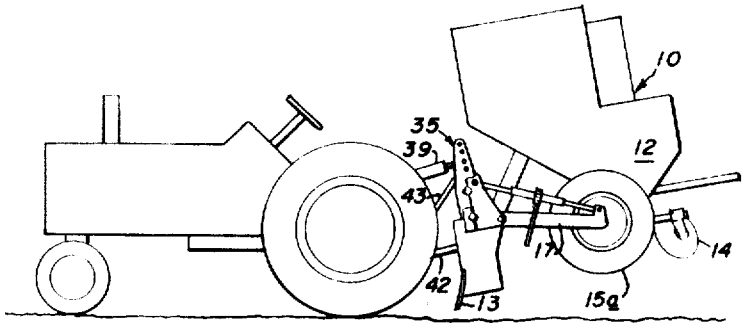
FIG. 5 is a reduced scale side elevational diagram showing the planter raised off of the ground by the hydraulic system of the tractor.

Referring now to FIG. 2, a three point hitch 35 is located at the center of the crossbar 19 and attached thereto by clamps 36. An upwardly extending torque arm 37 contains a series of holes 38 to one of which there is attached a hydraulic top link 39. A pair of depending brackets 40 are provided with holes [41] to which can be attached a tractor hitch 42 which is laterally rigid. A diagonal brace 43 maintains the hitch 42 at the same level thus controlling the depth of the furrow cut by the blade 13. The entire planter can be raised off the ground as shown in FIG. 5 by the hydraulic system of the tractor.

Referring again to FIGS. 2 and 3 [4], the bull wheel 15 is provided with a sprocket 44 which is connected by a chain 45 to a smaller sprocket 46 on a transverse drive shaft 47. The sprocket 46 can be adjusted lengthwise on the shaft 47 by means of a setscrew or spline (not shown) to match the separation of the two planting units. A third sprocket 48 is fixed on the end of the shaft 47 at the centerline between the two units and a chain 49 therefrom drives a sprocket 50 on a second transverse shaft 51 to which conveyor drive sprockets 52 are adjustably attached. An idler sprocket 53 is mounted at the top of the conveyor tube 22 and a second idler sprocket 54 is located at the lower end of the conveyor tube 22. A conveyor chain 55 is threaded through the tube 22 and on the said three sprockets, and in operation the chain rises vertically through the hopper 12 and downward through the tube 22. The conveyor chain 55 is provided with equally spaced cupped rings 56 which pick up seed potatoes 57 in their concave sides on the upward leg of the circuit. As the chain 55 turns over the upper sprocket 53 the potatoes fall onto the backs of the preceding rings 56 and ride down the diagonal leg of the circuit, falling off into the furrow as the chain 55 turns around the lower forward sprocket 54. A hardwood runner 58 is set into the back of the conveyor tube 22 to carry the weight of the chain 55 on its downward leg. If it is desired to combine two of the two row planters herein described to make a four row rig, an additional square or rectangular crossbar (not shown) exactly like the crossbar 19 but twice as long, is inserted in the square holes 59 in the torque arm 37 of the center hitch 35. A double length crossbar (not shown) is substituted for the crossbar 19. Notches 60 are provided in the hinge blocks 18 for the second crossbar so that it can be secured with clamps similar to the first crossbar clamps 20. The center hitch 35 is located midway between the two two-row units comprising the four row rig.

The invention is not limited to the exemplary construction herein shown and described, but may be made in various ways within the scope of the appended claims.

I claim:

1. In a potato planter for attachment to a tractor having a rearwardly extending vertically hinged three [way] *point* hitch, said potato planter being of the conveyor chain delivery type having an upwardly and rearwardly slanting conveyor tube, a plow unit mounted on the planter at the bottom thereof and in front of said tube, upper and lower idler sprockets adjacent the top and bottom of said tube, a first drive sprocket on a transverse shaft outwardly of said tube and beneath the upper said idler sprocket, a conveyor chain on said sprockets *and operatively connecting said three sprockets* and including a portion thereof extending through the length of said tube, a hopper surrounding the upper rear portion of said chain outwardly of said tube, a transverse bar rigidly mounted on the front of said planter and extending substantially across the width thereof, means connecting said bar with the rearwardly extending end of said three way hitch, at least one hinge block clamped on said [boar] *bar*, a lever extending rearwardly from said hinge block, a bull wheel on the extending end of said lever, a second drive sprocket driven by said bull wheel, a driven sprocket on said shaft and a drice chain *means* connecting the last said drive sprocket with the last said driven sprocket[.], *said driven sprocket in driving connection with said transverse shaft and said first drive sprocket thereon.*

2. In a potato planter as defined in claim 1, the construction wherein said hitch unit includes a pair of spaced depending brackets mounted on said crossbar, a torque arm extending thereabove, a tractor hitch connected with each said depending bracket, at least one diagonal brace between the extending end of a said hitch and said torque arm, a hydraulic cylinder connected at one end with said torque arm above said crossbar and means pivotally connecting the extending ends of said hitch and said cylinder with a tractor[.], *said tractor having a hydraulic system.*

3. In a potato planter as defined in claim 1, the construction including a turnbuckle pivotally connected between said hinge block and the extending end of said lever.

*4. In a planter for attachment to a tractor having a hydraulic system and a rearwardly extending vertically movable hitch, said planter being of the conveyor chain delivery type having a vertically extending conveyor tube,*

*a plow unit mounted on the planter at the bottom thereof and in front of said tube, upper and lower sprockets adjacent the top and bottom of said tube, respectively, a first drive sprocket on a transverse shaft beneath said upper sprocket,*

*a conveyor chain on said sprockets and operatively connecting said three sprockets and a portion of said chain extending through the length of said tube,*

*a hopper surrounding the upper portion of said chain outwardly of said tube,*

*a transverse bar rigidly mounted on the front of said planter and extending substantially across the width thereof, means connecting said bar with the rearwardly extending portion of said hitch,*

*at least one hinge block clamped on said bar, a lever extending transversely to said transverse bar from said hinge block, a bull wheel near the extending end of said lever, a second drive sprocket attached to and driven by said bull wheel,*

*a driven sprocket on said transverse shaft and a drive means connecting the second drive sprocket with the said driven sprocket, said driven sprocket in driving connection with said transverse shaft and said first drive sprocket thereon, whereby the entire planter can be raised off the ground by the hydraulic system of said tractor.*

*5. A potato planter as in claim 4 wherein said hitch is a vertically hinged three point hitch, the sprockets adjacent the top and bottom of the conveyor tube are idler sprockets, the first drive sprocket is located outwardly of said tube and the hopper surrounds the upper rear portion of the chain and said lever extends rearwardly from the hinge block.*

*6. Apparatus as in claim 5 wherein the conveyor tube is upwardly and rearwardly slanting.*

*7. In a potato planter as defined in claim 5, the construction wherein said hitch unit includes a pair of spaced depending brackets mounted on said crossbar, a torque arm extending therabove, a tractor hitch connected with each said depending bracket, at least one diagonal brace between the extending end of a said hitch and said torque arm, a hydraulic cylinder connected at one end with said torque arm above said crossbar and means pivotally and operatively connecting the extending ends of said hitch and said cylinder with said tractor and its hydraulic system.*

*8. Apparatus comprising a tractor in combination with a potato planter, said tractor having a hydraulic system and a rearwardly extending vertically movable hitch, said planter being of the conveyor chain delivery type having a vertically extending conveyor tube,*

*a plow unit mounted on the planter at the bottom thereof and in front of said tube, upper and lower sprockets adjacent the top and bottom of said tube, respectively, a first drive sprocket on a transverse shaft and beneath said upper sprocket,*

*a conveyor chain on said sprockets and operatively connecting said three sprockets and a portion of said chain extending through the length of said tube,*

*a hopper surrounding the upper portion of said chain outwardly of said tube,*

*a transverse bar rigidly mounted on the front of said planter and extending substantially across the width thereof, means connecting said bar with the rearwardly extending portion of said hitch,*

*at least one hinge block clamped on said bar, a lever extending transversely to said transverse bar from said hinge block, a bull wheel near the extending end*

*of said lever, a second drive sprocket attached to and driven by said bull wheel,*

*a driven sprocket on said transverse shaft and a drive means connecting the second drive sprocket with the said driven sprocket, said driven sprocket in driving connection with said transverse shaft and said first drive sprocket thereon, whereby the entire planter can be raised off the ground by the hydraulic system of said tractor.*

*9. Apparatus as in claim 8 wherein said hitch is a vertically hinged three point hitch, the sprockets adjacent the top and bottom of the conveyor tube are idler sprockets, the first drive sprocket is located outwardly of said tube and the hopper surrounds the upper rear portion of the chain and said lever extends readwardly from the hinge block.*

*10. Apparatus as in claim 8 wherein the conveyor tube is upwardly and rearwardly slanting and wherein said hitch unit includes a pair of spaced depending brackets mounted on said crossbar, a torque arm extending thereabove, a tractor hitch connected with each said depending bracket, at least one diagonal brace between the extending end of a said hitch and said torque arm, a hydraulic cylinder connected at one end with said torque arm above said*

*crossbar and means pivotally and operatively connecting the extending ends of said hitch and said cylinder with said tractor and its hydraulic system.*

References Cited

The following references, cited by the Examiner, are of record in the patented file of this patent or the original patent.

UNITED STATES PATENTS

| | | | |
|---|---|---|---|
| 1,034,017 | 7/1912 | Kitchen | 221—185 |
| 1,490,053 | 4/1924 | Willingham et al. | 172—439 UX |
| 2,646,657 | 7/1953 | Robertson | 172—448 X |
| 2,684,781 | 7/1954 | Allen et al. | 221—253 X |
| 3,024,851 | 3/1962 | Harres | 172—464 X |
| 3,039,541 | 6/1962 | Harden et al. | 172—677 |
| 3,077,290 | 2/1963 | Rehder | 221—177 X |
| 3,362,361 | 1/1968 | Morrison | 111—85 X |

STEPHEN C. PELLEGRINO, Primary Examiner

U.S. Cl. X.R.

172—439; 221—185, 253